United States Patent
Beshai et al.

(12) United States Patent (10) Patent No.: US 6,771,651 B1
(45) Date of Patent: Aug. 3, 2004

(54) PROVIDING ACCESS TO A HIGH-CAPACITY PACKET NETWORK

(75) Inventors: Maged E. Beshai, Stittsville (CA); Paul F. Daspit, San Diego, CA (US)

(73) Assignee: Nortel Networks Limited, Montreal (CA)

( * ) Notice: Subject to any disclaimer, the term of this patent is extended or adjusted under 35 U.S.C. 154(b) by 625 days.

(21) Appl. No.: 09/672,816

(22) Filed: Sep. 29, 2000

(51) Int. Cl.$^7$ .......................... H04L 12/28; H04L 12/56
(52) U.S. Cl. ...................... 370/401; 370/432; 370/400; 370/351
(58) Field of Search ................................ 370/351–356, 370/400, 401, 389, 392, 410, 390, 432, 475, 408

(56) References Cited

U.S. PATENT DOCUMENTS

| | | | | |
|---|---|---|---|---|
| 5,430,730 A | * | 7/1995 | Sepulveda-Garese et al. | 370/254 |
| 5,535,208 A | * | 7/1996 | Kawakami et al. | 370/391 |
| 6,088,336 A | * | 7/2000 | Tosey | 370/255 |
| 6,335,937 B1 | * | 1/2002 | Chao et al. | 370/426 |
| 6,504,829 B1 | * | 1/2003 | Young et al. | 370/337 |
| 2003/0202539 A1 | * | 10/2003 | Fukunaga et al. | 370/489 |

* cited by examiner

Primary Examiner—Ajit Patel (57) ABSTRACT

A simple access device provides access to a high-capacity network to a traffic source. Once connected to a traffic source, an edge module in the high-capacity network can assign a sub-network address to the traffic source so that the source may also serve as a sink for data traffic. Although the sub-network address assigned to the traffic source may bear little resemblance to a network address for the edge module, distant edge modules may route traffic to a traffic sink having such a sub-network address easily and flexibly. Features may be added to the access device, which would otherwise be little more than a multiplexer, but, for the most part, the edge modules make the routing decisions. Data transfer from the current Internet to the high-capacity network and vice versa can be facilitated by requiring that each edge module in the high-capacity network that acts as a gateway be bilingual, that is, understand both a simple high-capacity network-specific routing protocol and conventional Internet protocols.

13 Claims, 9 Drawing Sheets

PROVIDING ACCESS TO A HIGH-CAPACITY PACKET NETWORK

FIELD OF THE INVENTION

The present invention relates to a new high-capacity packet network, more particularly, the present invention relates to providing access to such a high-capacity packet network.

BACKGROUND OF THE INVENTION

A data communication network may be modeled as a set of nodes (or modules) interconnected by links. The purpose of such a data network may be seen to be the transfer of data from a traffic source to a traffic sink. As traffic sources and sinks are often paired, this transfer of data may be said to occur between one traffic source/sink and another traffic source/sink. The nodes that connect to both the data network and to traffic sources/sinks may be called edge modules (or edge nodes or edge routers), while those nodes that connect only to other nodes within the data network may be called core modules. When a packet of data traffic arrives at an edge module, the edge module may examine the packet to determine the destination of the packet. Based on this determination, the edge module may then select a route, perhaps from a predetermined table of routes (a routing table), for the packet to take through the core of the network to an edge module connected to the packet destination. Such a route selection process may be designed to meet certain criteria specified by the packet or known to be related to the traffic source. Further, the route selection process may be performed in such a way as to optimize use of the network resources.

In U.S. patent application Ser. No. 09/624,079, titled "Multi-Dimensional Lattice Network," filed on Jul. 24, 2000, the contents of which are hereby incorporated herein by reference, an architecture of a high-capacity network is described. The high-capacity network is an N-dimensional lattice network, with N>1, that comprises a plurality of edge modules having respective identities. Each of the edge modules is directly connected to N core modules for switching connections between edge modules. The core modules of this high-capacity network may be agile switches that reconfigure to adapt to changing traffic loads. Further, addressing of nodes within this high-capacity network is coordinate-based and routing of packets is simplified relative to known addressing and routing methods.

The high-capacity network is structured to avoid the need for complex protocols such as those used in the current Internet. Addressing schemes in the high-capacity network have the potential to allow enormous growth in numbers of nodes interconnected and to provide many of the services supplied by the present Internet as well as many services not yet imagined.

To take advantage of such a high-capacity network, traffic sources/sinks must be provided access to the high-capacity network in a simple and straightforward manner. Further, since a high-capacity network may need to pass data to a current packet network such as the Internet, an addressing scheme which provides transparent data flow between such networks is required.

SUMMARY OF THE INVENTION

A simple access device allows a traffic source access to the described high-capacity network. Once connected to a traffic source, an edge node in the high-capacity network can assign a sub-network address to the traffic source so that the traffic source may also serve as a sink for data traffic. Although the sub-network address assigned to the traffic source may bear little resemblance to a network address for the edge node, distant edge nodes may route traffic to a traffic sink having such a sub-network address easily and flexibly. Features may be added to the access device, which may be little more than a multiplexer, but, for the most part, the edge nodes make the routing decisions. Data transfer from the current Internet to the high-capacity network and vice versa can be facilitated by requiring the particular edge nodes in the high-capacity network that act as a gateway be bilingual, that is, understand both a simple high-capacity network-specific routing protocol and Internet protocols.

In accordance with an aspect of the present invention there is provided a method of providing access to a high-capacity data network at an edge node of the high-capacity data network. The method includes, where an access device connects to the edge node, assigning a device number to the access device, if not already assigned and, upon receipt of an indication of a traffic source from the access device, assigning a user number to the traffic source, if not already assigned. The method further includes, upon assigning the user number, formulating a sub-network address for the traffic source and broadcasting the sub-network address to a pre-defined set of nodes. In another aspect of the invention an edge node is provided for performing this method. In a further aspect of the present invention, there is provided a software medium that permits a general purpose computer to carry out this method.

In accordance with another aspect of the present invention there is provided, at an edge node in a high-capacity data network communicatively coupled to other nodes in the high-capacity data network and to an access device, a method of providing the access device with information for use in a routing decision. The method includes receiving, from the access device, a request for a cost indication associated with transmitting a packet to a destination, determining the cost, formulating the cost indication based on the cost and transmitting the cost indication to the access device. In another aspect of the invention an edge node is provided for performing this method. In a further aspect of the present invention, there is provided a software medium that permits a general purpose computer to carry out this method.

In accordance with a further aspect of the present invention there is provided a method of providing access to a high capacity network. The method includes receiving a packet from a traffic source addressed to a traffic sink and, based on a sub-network address for the traffic sink in the packet, determining a set of nodes of the high capacity network providing connectivity to the traffic sink. The method further includes selecting one node from the set of nodes as a destination node and, after the selecting, determining a route through nodes of the high capacity network to the destination node. In another aspect of the invention an edge node is provided for performing this method. In a further aspect of the present invention, there is provided a software medium that permits a general purpose computer to carry out this method.

In accordance with a still further aspect of the present invention there is provided, at an edge node in a high-capacity data network, a method of determining a route for a connection to a traffic sink including receiving a connection request from a traffic source, the connection request including a destination sub-network address, parsing the destination sub-network address to determine a destination constellation and an access code, selecting a destination edge node in the destination constellation according to the access code and selecting a route to the destination edge node. In another aspect of the invention an edge node is provided for performing this method. In a further aspect of the present invention, there is provided a software medium that permits a general purpose computer to carry out this method.

In accordance with another aspect of the present invention there is provided, at a first node in a first packet network using a first communication protocol, a method of routing a packet from a second node in a second packet network using a second communication protocol to a destination in the first packet network. The method includes receiving the packet using the second communication protocol, examining the packet to determine the destination, selecting a route through the first packet network to the destination and transmitting the packet to the destination using the first communication protocol. In another aspect of the invention an edge node is provided for performing this method. In a further aspect of the present invention, there is provided a software medium that permits a general purpose computer to carry out this method.

In accordance with still another aspect of the present invention there is provided, at a first node in a first packet network using a first communication protocol, a method of routing a packet from a source in the first packet network to a destination in a second packet network using a second communication protocol. The method includes receiving the packet using the first communication protocol, examining the packet to determine the destination, selecting a route through the second packet network to the destination and transmitting the packet to the destination using the second communication protocol. In a further aspect of the present invention, there is provided a software medium that permits a general purpose computer to carry out this method.

In accordance with yet another aspect of the present invention there is provided a method of providing information to a pre-defined set of nodes, the information regarding an access device. The method includes, where an access device connects to the edge node, assigning a device number to the access device, if not already assigned. The method further includes, upon assigning the device number, formulating a welcome message indicating an association of the device number to the access device and broadcasting the welcome message to the pre-defined set of nodes.

In accordance with a yet further aspect of the present invention there is provided a format for a data packet including a sub-network address identifying a traffic sink by connection to an access device and a constellation. The sub-network address includes an indication of a constellation number associated with the constellation; an indication of a length of the indication of the constellation number; an indication of a device number associated with the access device; an indication of a length of the indication of the device number; an indication of a user number associated with the traffic source; an indication of specific edge nodes in the constellation to which the access device connects; and an indication of a length of the data packet.

In accordance with still another aspect of the present invention there is provided a computer data signal, embodied in a carrier wave, including a data packet that includes an indication of a constellation number associated with a constellation; an indication of a length of the indication of the constellation number; an indication of a device number associated with an access device; an indication of a length of the indication of the device number; an indication of a user number associated with a traffic source; an indication of specific edge nodes in the constellation to which the access device connects; and an indication of a length of the data packet.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
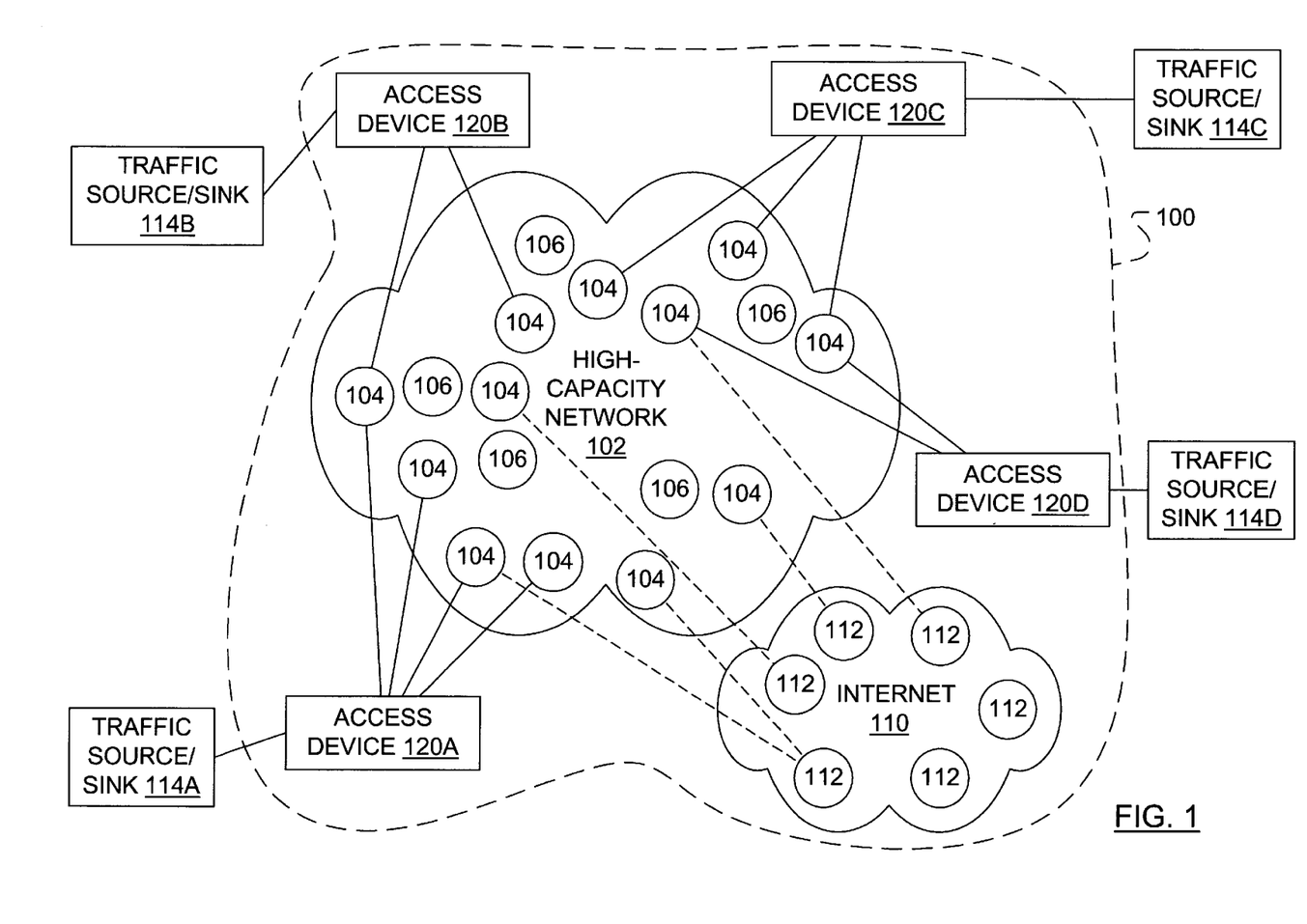
FIG. 1 illustrates a communication system as a hybrid network including a high-capacity network, a legacy packet network and a number of access devices.

FIG. 1 models a communication system as a hybrid network 100 including a high-capacity network 102 and a legacy packet network (e.g., the Internet) 110. The high-capacity network 102 may be, in accordance with the U.S. patent application Ser. No. 09/624,079, titled "Multi-Dimensional Lattice Network," a multi-dimensional lattice network adapted to support high speed data transport over a large geographical area. The high-capacity network 102 includes a plurality of edge modules (referred to collectively or individually as edge module(s) 104). Each edge module 104 may be identified by N coordinates that define a relative position of the edge module 104 in the high-capacity network 102. The high-capacity network 102 also includes a plurality of core modules (referred to collectively or individually as core module(s) 106) to switch data packets between the plurality of edge modules 104. Each edge module 104 may be connected to several core modules 106. Each core module 106 may be an optical switch that may be reconfigured as the need arises. Reconfiguration of a core module 106 is coordinated with reconfiguration of a source edge module 104. The mechanics of these reconfigurations are typically invisible to a network user and are therefore mentioned here only in passing to indicate that the mechanics are irrelevant to the task of addressing and routing in the high-capacity network 102. The Internet 110 accommodates a large number of legacy routers (referred to collectively or individually as Internet routers 112), also interconnected by links (not shown). Selected ones of these Internet routers 112 interconnect with edge modules 104. Traffic sources and sinks 114A, 114B, 114C, 114D (referred to collectively as traffic sources and sinks 114) gain access to the high-capacity network 102 via a plurality of access devices 120A, 120B, 120C and 120D (referred to collectively as access devices 120) that are connected by access links to edge modules 104.

Figure 2:
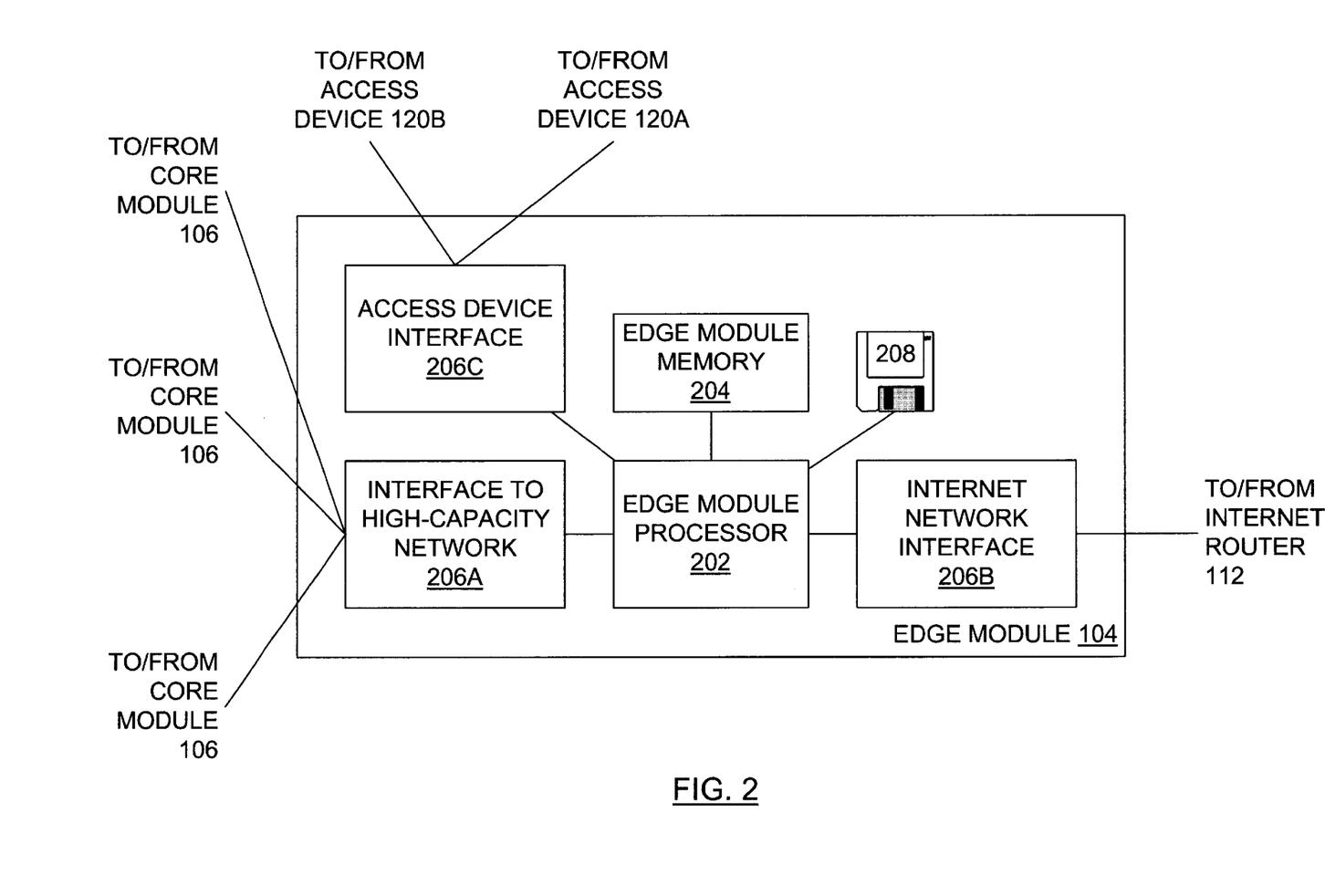
FIG. 2 illustrates an exemplary edge module of the hybrid network of FIG. 1 in accordance with an embodiment of the present invention.

An exemplary edge module 104 is illustrated in FIG. 2. Included in the edge module 104 are an edge module processor 202 and an edge module memory 204. As different edge modules 104 may be used for connecting access devices 120 or Internet routers 112 to core modules 106 in the high-capacity network 102, different network interfaces may be required. An interface 206A to the high-speed network is essential, while an Internet network interface 206B and an access device interface 206C are optional, dependent upon the intended use for the edge module 104. For instance, if edge module 104 is to support Internet access, the Internet network interface 206B is required and the access device interface 206C may not be required. The edge module processor 202 may be loaded with sub-network address assigning and/or packet routing software for executing methods exemplary of this invention from software medium 208 which could be a disk, a tape, a chip or a random access memory containing a file downloaded from a remote source.

Figure 3:
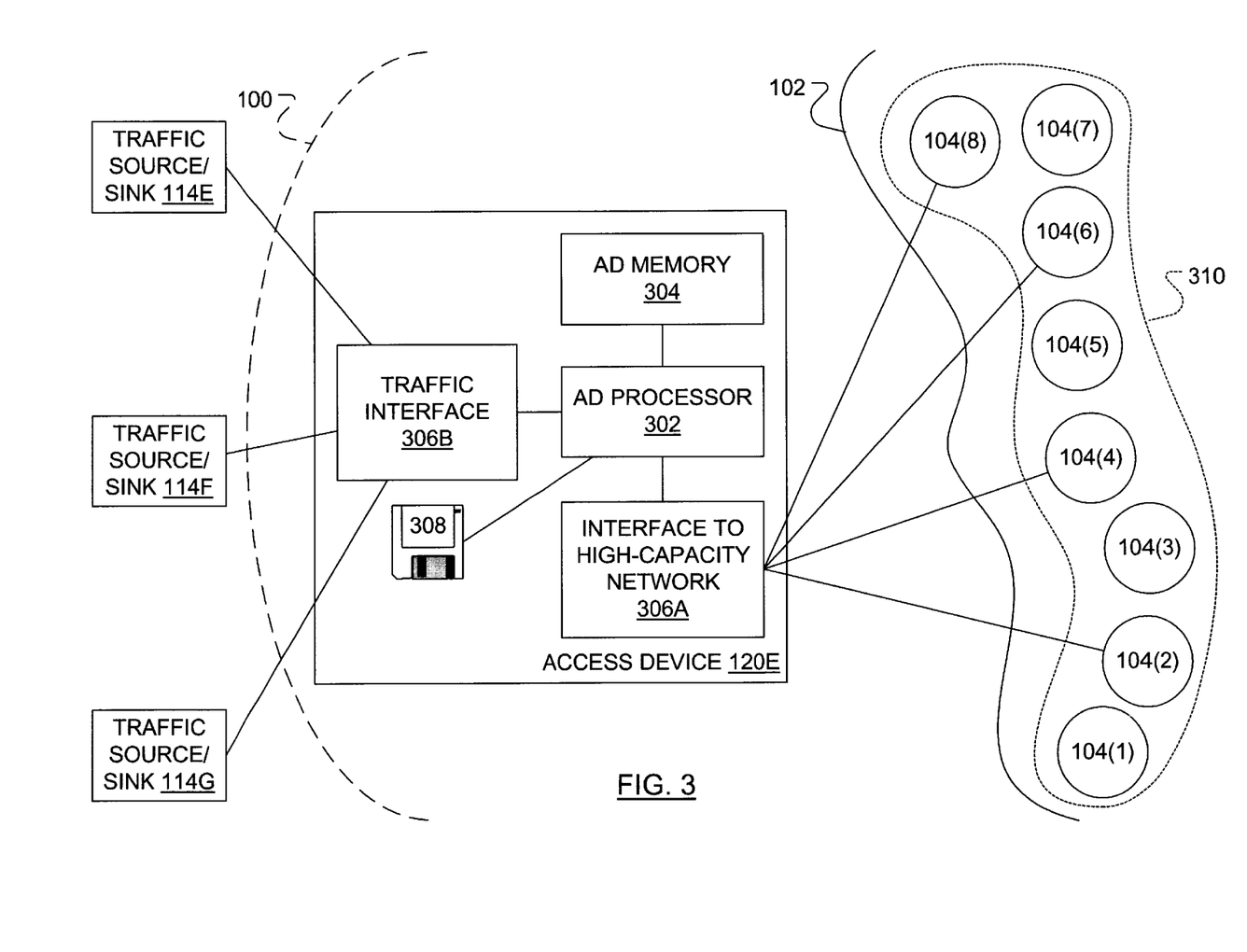
FIG. 3 illustrates an exemplary access device of the hybrid network of FIG. 1 connected to traffic sources/sinks and a constellation of nodes in the high-capacity network of FIG. 1 in accordance with an embodiment of the present invention.

Components of an exemplary access device (AD) 120E are presented in FIG. 3. As shown, the AD 120E is considered part of the hybrid network 100. Included in the AD 120E are an AD processor 302 and an AD memory 304. Also included is an interface 306A for connecting to selected ones of a set of edge modules 104(1), 104(2), 104(3), 104(4), 104(5), 104(6), 104(7) and 104(8) over access links to the high-capacity network 102. Further, a traffic interface 306B is included for connecting the access device 120E to traffic sources and sinks 114E, 114F, 114G. The access links to the edge modules 104(1), 104(2), 104(3), 104(4), 104(5), 104 (6), 104(7) and 104(8), which are part of a constellation 310, may be unidirectional or bi-directional. The AD processor 302 may be loaded with packet routing software for executing methods exemplary of this invention from software medium 308 which could be a disk, a tape, a chip or a random access memory containing a file downloaded from a remote source. Many functions of the access device 120E that allow the access device 120E to execute methods exemplary of this invention are simple and known. These functions may, though not illustrated as such, be implemented in hardware.

In overview, the traffic sources and sinks 114 are provided access to the high-capacity network 102 via access devices 120. Once granted access to the high-capacity network 102, a particular traffic sink of the traffic sources and sinks 114 will require a sub-network address so that a remote traffic source can appropriately direct a packet. To this end, a sub-network addressing scheme is introduced for the traffic sources and sinks 114. This sub-network addressing scheme requires that some arrangements be made within the high-capacity network 102. Furthermore, access may be granted to traffic sources and sinks within the Internet 110 by specific ones of the edge modules 104 that are designated as gateways. These gateway edge modules are "bilingual" in that they have an ability to communicate using both a simple routing protocol specific to the high-capacity network 102 and protocols specific to the Internet 110. The bilingual ones of the edge modules 104 allow for a harmonious co-existence between the Internet 110 and the high-capacity network 102.

The following discussion assumes that the high-capacity network 102 corresponds to the lattice network described in the U.S. patent application Ser. No. 09/624,079, titled "Multi-Dimensional Lattice Network," though, as will be appreciated, it is not intended that the high-capacity network 102 be limited to this lattice network. However, the lattice structure is preferred due to its flexibility, tractability and ease of routing and control. Each node in the high-capacity network 102, and hence each edge module 104, may be identified by N coordinates. In a two-dimensional logical arrangement, a particular edge module 104 may be identified as (212, 177). This two-dimensional logical arrangement automatically identifies, to a source edge module 104, the best routes to particular destination edge module 104. The edge modules 104 may be organized in a plurality of sub-nets, where each sub-net includes at least two edge modules 104 having N−1 corresponding identical coordinates. Consequently, each sub-net is associated with a particular coordinate. Each of the edge modules 104 in a sub-net is directly connected to at least one core module 106 for switching connections between edge modules. Note that sub-nets and constellations need not bear any specific relationship to each other (to fully understand sub-nets, see U.S. patent application Ser. No. 09/624,079). Advantageously, assigning coordinates to the edge modules 104 allows for the edge modules 104 to be referenced directly, i.e., without the need for the cumbersome translation process known as address resolution. The U.S. patent application Ser. No. 09/624,079, titled "Multi-Dimensional Lattice Network," also describes a route-set generation method, well suited to the lattice network, involving permutations and rotations.

In the high-capacity network 102, topology information is distributed only when planned connectivity changes take place. These include the addition of a new edge module 104, increasing or decreasing the links at an edge module 104 and adding or moving an access device 120. The distribution of the topology data may be performed according to U.S. patent application Ser. No. 09/405,003, titled "State Information and Routing Table Updates in Large Scale Data Networks," filed Sep. 27, 1999, the contents of which are hereby incorporated herein by reference.

In the high-capacity network 102, network-state information is not distributed as it is in many other networks. In the Internet 110, for instance, if a failure occurs on a unidirectional link between a node X and a node Y, several other nodes in the autonomous system receive notice of the failure. In the high-capacity network 102, however, only the node X makes note of the link failure, and adjusts a respective route-set generation procedure accordingly. Similarly, when a node fails, the only other nodes that need to know are those nodes that are directly connected to the failed node. The rest of the high-capacity network 102 is not directly informed and need not be informed. However, a particular node in the high-capacity network 102 may learn of such node or link failures if the failures have an effect on the route-set maintained at the particular node, as hereinafter described.

In contrast with the Internet, which is hierarchical with low connectivity, the high-capacity network 102 is highlyconnected and non-hierarchical. The high-capacity network 102 comprises a large number of high-capacity edge modules 104 interconnected by unintelligent core modules 106 that cannot and need not read the data carried. Each edge module 104 maintains, or may easily generate, a set of routes (route-set) to each other edge module 104. A route-set may include several routes and the routes in each route-set may be sorted according to some merit, for example, cost or propagation delay. If the core is static, the capacity of each route in a route-set is fixed. If the core is agile, the capacity of the routes in each route-set may adapt to traffic-level variation. In either case, whether the core is static or dynamic, an edge module 104 may learn network-state information through a route-continuity indication. A given edge module 104 cannot ascertain that an outgoing route is functional by inspecting a respective outgoing port. The given edge module 104 must, therefore, send frequent, possibly periodic, continuity packets to each other edge module through each activated route. Each other edge module may then confirm the functionality of the activated routes by returning a confirmation packet in respect of each received continuity packet. For example, if edge module-X uses two routes to edge module-Y, and edge module Y uses one route to edge module-X, then a simple exchange of packets between edge module-X and edge module-Y can reliably determine the continuity of the three routes (two from X to Y and one from Y to X).

If, for instance, edge module-X wants to know if it can reach edge module-Y. Edge module-X sends a continuity packet to edge module-Y through a given route, i.e., a route to be tested. The continuity packet may include an identifier of edge module-X (i.e., the network address of edge module-X) and a serial number that is specific to the directed edge module pair {edge module-X, edge module-Y}. Preferably, to reduce the volume of packets, the continuity packet would also inform edge module-Y about the latest packet number that edge module-X received from edge module-Y. Thus, edge module-Y is provided with the knowledge that edge module-X may be reached through the route previously chosen by edge module-Y (the route that was being tested by edge module-Y) and, likewise, when edge module-Y replies with a "piggy-back" of the latest packet number sent by edge module-X to edge module-Y, edge module-X can determine whether or not the tested edge module-X-to-edge module-Y route is functional. If not, edge module-X marks the route-set to edge module-Y accordingly until continuity is assured at a later time.

Understandably, this exchange of packets leads to an amount of overhead traffic in the high-capacity network 102. In an exemplary network with a total capacity of 20 Petabits/second, comprising 10,000 edge modules of four Terabits/s capacity each (two Terabits/s of user access and two Terabits/s facing the core), the overhead of exchanging continuity packets would be of the order of 20 Megabits per second per edge module (based on a 40 byte continuity packet sent every 160 milliseconds). The relative overhead in this case is $10^{-5}$ (20 Mb/s divided by 2 Tb/s), which may be considered a very insignificant cost.

In the high-capacity network 102, link failures (and node failures) do not result in route-set regeneration because of the existence of multiple parallel routes for each node pair. Routes in an existing route-set may, instead, be marked as temporarily unavailable until recovery. A method of handling network-failure conditions is described in U.S. patent application Ser. No. 09/405,003, hereinbefore referenced.

For a given edge module pair that includes a source edge module and a destination sink edge module, there is a multitude of routes through a lattice network. For an N-dimensional lattice network, it is preferable that N shortest routes be used. As described in U.S. patent application Ser. No. 09/624,079, titled "Multi-Dimensional Lattice Network," each edge module 104 maintains capability to generate a route-set corresponding to each other edge module 104, where a route-set to a particular other edge module is a list of "mutually exclusive" routes having the least number of hope to the particular other edge module 104. These routes may be ranked according to some criteria such as capacity or propagation delay. Once determined, these route-sets are modified only when necessitated by planned topological changes. Failures, of particular nodes or links to particular nodes, only temporarily suspend the use of one or more routes in a route-set. The source edge module may select a particular route to the destination edge module randomly from the route-set or according to a predetermined load sharing method.

The access devices (ADs) 120 are preferably simple multiplexers that receive packets from a number of subtending traffic sources 114 and forward the packets to edge modules 104 for transport over the high-capacity network 102 to destination traffic sinks 114. As illustrated in FIG. 1, each AD 120 connects to K edge modules 104. An edge module 104 to which an AD 120 connects may be termed an edge module that is "adjacent" to the AD 120. A reasonable number K of adjacent edge modules is two to four.

Figure 4:
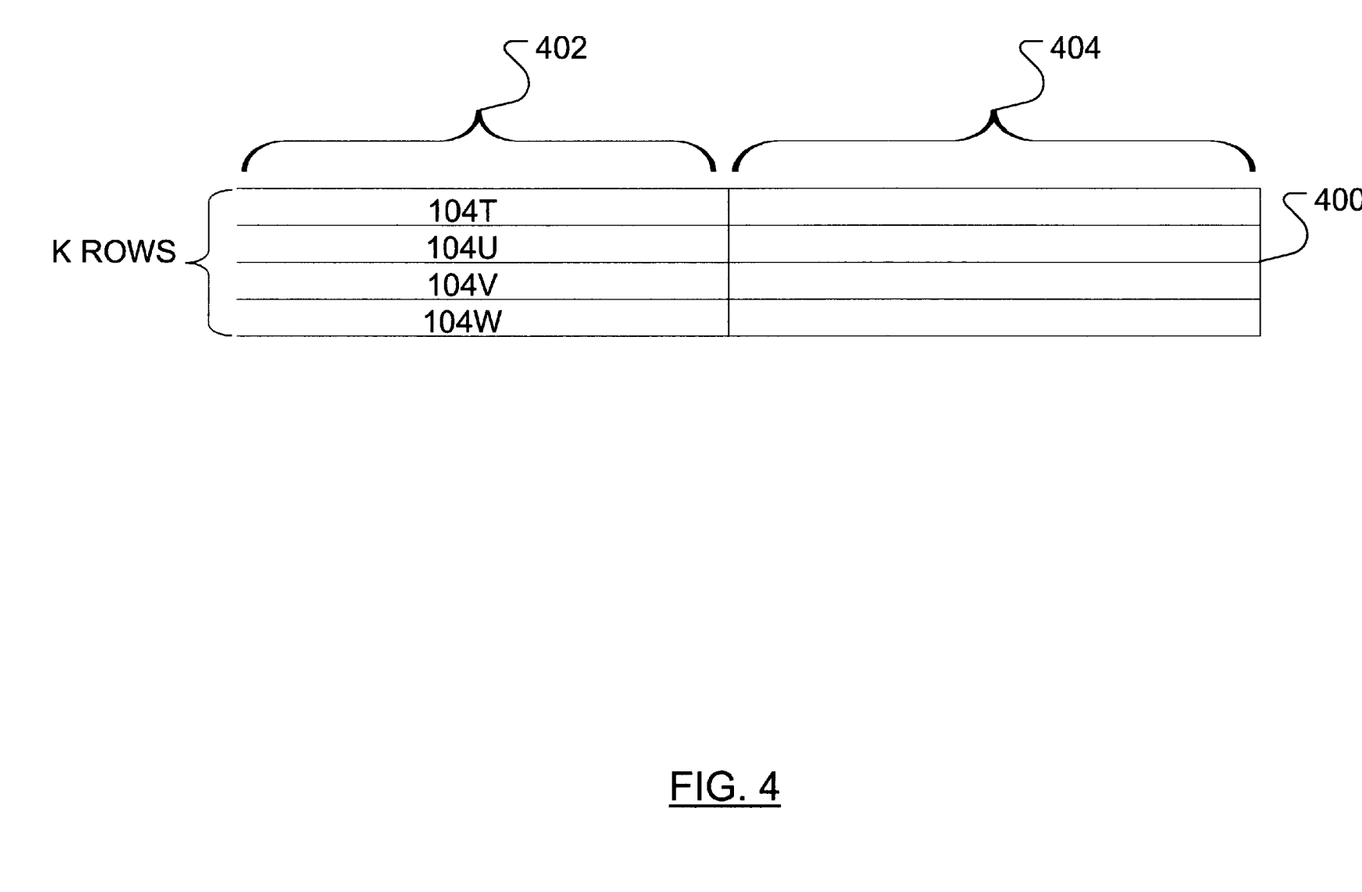
FIG. 4 illustrates an access vector for use by the access device of FIG. 3 in accordance with an embodiment of the present invention.

Turning to FIG. 3 in conjunction with FIG. 4, when the AD 120E is installed in the hybrid network 100, the AD 120E selects K adjacent edge modules 104 and formulates an access vector 400 that has K records. Each of the K records has two fields 402, 404 and corresponds to a single adjacent edge module 104 of the AD 120E. The first field 402 contains the identity of an adjacent edge module 104 and the second field 404 is an optional field that may contain information to indicate ranking of each link from the AD 120 to an adjacent edge module 104.

Ideally, each AD 120 is free to choose a set of K edge modules from among all edge modules 104 in the high-capacity network 102. However, this freedom may require a prohibitively extensive routing table at each edge module 104. A compromise is to form constellations of nodes, where each AD 120 is limited to choose a set of K edge modules 104 from among the edge modules 104 in a single constellation. A typical constellation may include eight edge modules 104, as does the constellation 310 in FIG. 3. A network of 16 million nodes, for example, may be arranged into two million eight-node constellations. Constellations do not overlap, i.e., each edge node can belong only to one constellation. When a constellation is formed, information about the constellation may be broadcast across the high-capacity network 102. Such information may include a constellation number and an indication of network addresses (coordinates) of the set of nodes that are members of the constellation (a node-set). The constellation number need not bear any specific relationship to coordinates assigned to the member nodes of the constellation.

The installation of the AD 120E in the hybrid network 100 effectively allows a subtending traffic sources/sinks 114 to be specified as a destination for a packet. Consequently, each traffic sources/sinks 114 requires a sub-network address. In one scheme for assigning a sub-network address to a particular traffic source/sink 114E, the sub-network address includes identification of the AD 120E and the constellation 310 through which access to the hybrid network 100 is granted. The assigned sub-network address may also include an indication (an "access code") of the nature of the access to the constellation 310, i.e., to which of the edge modules in the constellation the AD 120E connects.

The constellation 310 may be identified by a constellation number as previously discussed. However, an identification scheme for the AD 120E has not yet been discussed. In one embodiment of the present invention, the edge modules of the constellation 310 are locally numbered and the first edge module 104 within the constellation 310 to which the AD 120E connects assigns an "access device number" to the AD 120E. After assigning an access device number to the AD 120E, the first edge module 104 may form a "welcome" message that is broadcast to each other edge module 104 in the constellation 310 and includes the access device number. Upon receipt of the welcome message, the other edge modules 104 make note of the access device number.

The access device numbers that may be assigned by a particular edge module 104 are a subset of a range of access device numbers that may be assigned by all nodes in a constellation. If each eight-node constellation assigns access numbers ranging from 0 to 65,535, the assignable access device numbers may be divided into 8,192-number subsets. However, if a strategy is employed in which each subset contains a continuous range of access device numbers, then, even when very few access devices are connected to a constellation, 16 bits may be necessary to identify a particular access device. A better strategy is to distribute access numbers in the subsets logically, so that, for instance, subsets include strings of continuous access numbers that are 32 access numbers long. In this latter strategy, the access numbers assignable by the particular edge module 104 may include [32 . . . 63, 288 . . . 319, . . . , 65312 . . . 65343] and, therefore, when the very few access devices are connected to a constellation, only eight bits may be necessary to identify a particular access device. This assignment of subsets of ranges of addresses to sub-network address granting modules is known.

As there may be several traffic source/sinks 114E, 114F, 114G subtending from a particular AD 120E, identification of the AD 120E and the constellation 310 is not enough information to route a packet to a particular traffic source/sink 114. So that the traffic source/sink 114E may be uniquely identified, one of the edge modules 104(2), 104(4), 104(6), 104(8) adjacent to the AD 120E may assign a "user number" to the traffic source/sink 114E responsive to receiving notice that the traffic source/sink 114E has been connected to the AD 120E.

Figure 5:
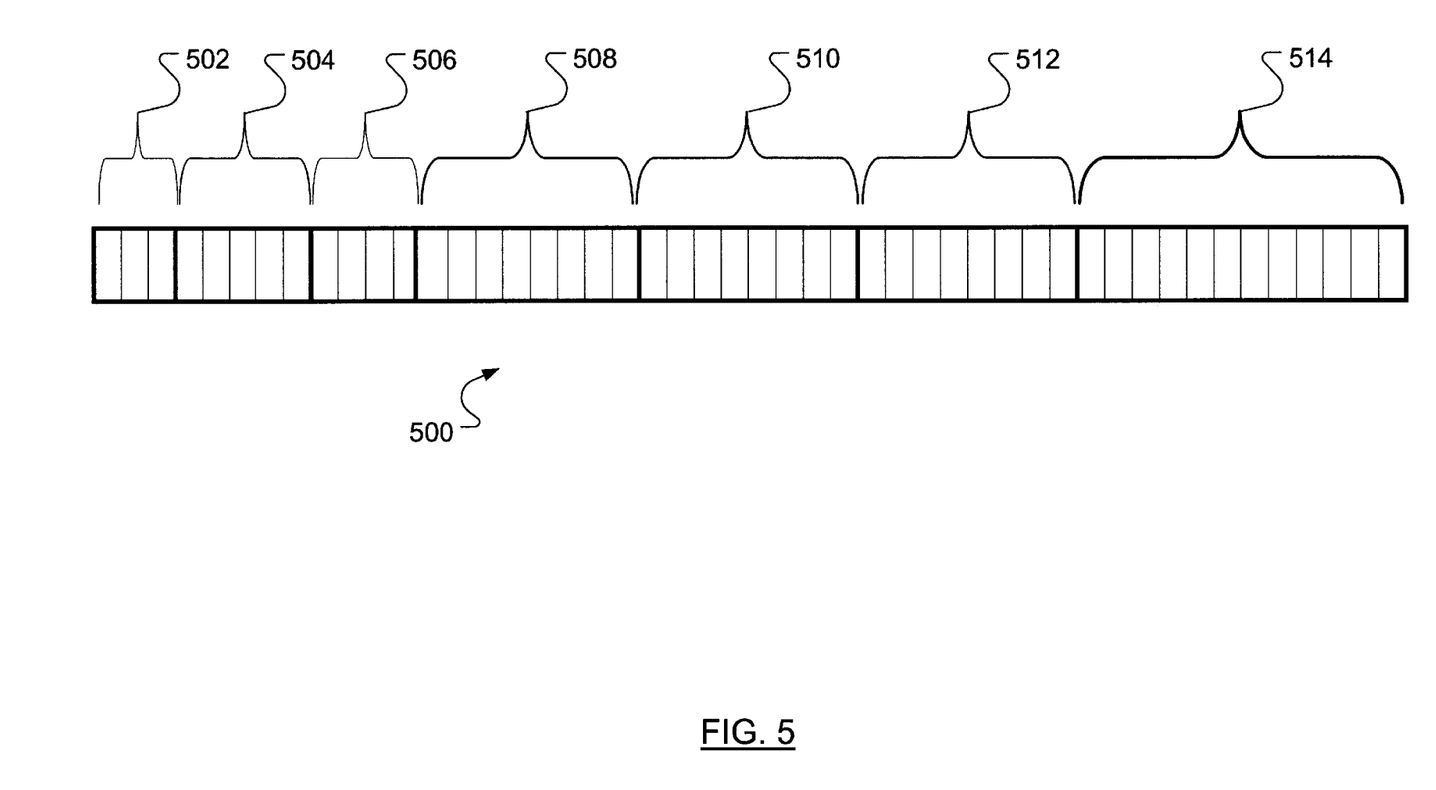
FIG. 5 illustrates an exemplary traffic source/sink sub-network address.

An exemplary traffic source/sink sub-network address 500 is illustrated in FIG. 5. A field 510 is provided to contain the constellation number while a field 512 is provided to contain an access device number, a field 514 is provided to contain a user number and a field 508 is provided to contain an access code. As each of the constellations in the high-capacity network 102 has the same maximum size, the access code field 508 may have a fixed length, having a number of bits equivalent to the maximum number of nodes in a constellation. However, defining an alternative format for the sub-network address 500 wherein the access code field 508 has a variable length would be trivial.

Considering that the high-capacity network 102 may, someday, include millions of constellations, a budget of 32 bits for the length of the constellation number field 510 may be appropriate. Similarly, a budget of 16 bits for the access device number field 512 allows for as many as 65 536 ADs to connect to a single constellation. However, the high-capacity network 102 may, at first, be a network of a relatively small number of constellations, with only a few ADs accessing each constellation. In fact, even with a fully populated network, short addresses are still desirable when constellation numbers or access device numbers are small. As such, using a 32 bit field to identify a constellation that may be identified using only four bits may be seen as wasteful. Hence, it is hereby proposed that the constellation number field 510 have a variable length. Similarly, the access device number field 512 may also have a variable length. To accommodate these variable length fields, the traffic source/sink sub-network address 500 further requires fields that specify the length of the variable length fields. Specifically, a field 504 is provided in traffic source/sink sub-network address 500 to indicate the length of the constellation number field 510 and a field 506 is provided to indicate the length of the access device number field 512. The length of each of these length-indicating fields 504, 506 is fixed to a value related to the maximum length of the field to which they correspond, i.e., the constellation number field length field 504 is five bits long, with a capacity to indicate a constellation number field length of up to 32 bits. Finally, a field 502 is provided to indicate a length, in bytes, of the entire traffic source/sink sub-network address 500. Notably, the minimum length of the entire traffic source/sink sub-network address 500 is four bytes and the total length of fields 502, 504, 506, 508 is always 20 bits.

Although the user number field 514 has a variable length, a field is not provided for the purpose of indicating a length of the user number field 514. The sub-network address byte-length field 502, however, serves this purpose. Further, the user number field 514 is arbitrarily expanded so that the total number of bits in the traffic source/sink sub-network address 500 is divisible by eight. Zeroes may be added as the most significant bits of the user number to fill up the user number field 514.

Although the length-indicating fields 504, 506 are said to indicate the length of a respective variable length field, the value contained in the field is preferably not exactly the length of the field in bits. As the length of a variable length field will never be zero, the length-indicating fields 504, 506 may contain a value that is one less than the length of the respective variable length field. Thus, 0000 indicates a field length of one bit and 0100 indicates a field length of five bits. Similarly, because, as discussed, the minimum size of the entire sub-network address is four bytes, the sub-network address byte-length field 502 may contain a value that is four less than the length of the traffic source/sink sub-network address 500 Note that the length of the traffic source/sink sub-network address 500 is selected to be an integer multiple of bytes to conform with typical addressing schemes.

The access code can be expressed in several ways. The simplest way, if the constellation size is 16 nodes or less, is to let the position of a bit indicate a corresponding node in the constellation. For example, if each constellation includes eight nodes, the nodes of each constellation may be internally numbered from 0 to 7. Using such a sub-network addressing scheme, an access code of 00110101 indicates, reading from left to right, that a particular AD 120 is connected to edge modules 2, 3, 5 and 7, i.e., the 1s in the access code correspond to edge modules 104 connected to the AD 120. The advantage of this scheme is that an AD 120 may have an arbitrary number of access links, as long as the number of access links does not exceed the size of the respective constellation.

In the following examples, sub-network addresses are presented in format that separates the fields 502, 504, 506, 508, 510, 512 and 514 by periods. In a first example, an AD has been assigned access device number 120 (which is a seven-bit number, 1111000, in binary) and accesses the edge modules number 2, 4, 6 and 8 in constellation number 2 (which is 10, in binary), the sub-network address may be assigned as:

000.00001.0110.010101.10.1111000.101 (32 bits)

The length indicating fields 504, 506 above contain the values one (represented as 00001) and six (represented as 0110) as the corresponding fields have lengths of two (constellation number) and seven (access device number), respectively.

In a second example, an AD has been assigned access device number 1612 (which is an 11-bit number, 11001001100, in binary) and accesses the edge modules number 2, 4, 6 and 8 in constellation number 24,584 (which is a 15-bit number, 110000000001000, in binary), the sub-network address may be assigned as:

011.01110.1010.01010101.110000000001000.1100100 1100.0010000001 (56 bits

The length indicating fields 504, 506 above contain the values 14 (represented as 01110) and ten (represented as 1010) as the corresponding fields have lengths of 15 (constellation number) and 11 (access device number), respectively. Before considering the user number, the total sub-network address length is 54 bits, so two zero bits are added to the user number to result in a total sub-network address length of 56 bits, which is seven bytes and represented in the sub-network address byte-length field 502 as 011 (7−4=3).

In a third example, an AD has been assigned access device number 1612 and accesses the edge modules number 2, 4, 6 and 8 in constellation number 2,097,279 (which is a 22-bit number, 1000000000000001111111, in binary), the sub-network address may be assigned as:

100.10101.1010.01010101.1000000000000001111111. 11001001100.00010000001 (64 bits)

The length indicating fields 504, 506 above contain the values 21 (represented as 10101) and ten (represented as 1010) as the corresponding fields have lengths of 22 (constellation number) and 11 (access device number), respectively. Before considering the user number, the total sub-network address length is 61 bits, so three zero bits are added to the user number to result in a total sub-network address length of 64 bits, which is eight bytes and represented in the sub-network address byte-length field 502 as 100 (8−4=4).

The capacity of individual access links to the edge modules 104 in a given constellation may vary. For example, the access link from the AD 120E to the edge module 104(6) in the constellation 310 may have a capacity of 20 Gb/s while the access links to the other edge modules 104(2), 104(4), 104(8) may only be 10 Gb/s. An indication of link capacity may be provided to the AD 120E to assist in load balancing as-will-be-explained hereinafter.

Upon connection of the traffic source/sink 114F to the AD 120E, the edge module 104(2) may assign a sub-network address to the traffic source/sink 114F. Once the edge module 104(2) has assigned a sub-network address to the traffic source/sink 114F, the edge module 104(2) forms a "welcome" message that is broadcast to each other edge module 104 in the constellation 310 and includes the newly assigned sub-network address. Upon receipt of a welcome message, an edge module 104 includes the traffic source/sink 114F in a routing table. Advantageously, the constellation 310 through which the sub-network address is broadcast is significantly smaller than the high-capacity network 102. At each edge module 104, the access device number field of a sub-network address that is received in a welcome message is confirmed against a record of access device numbers known within the constellation 310.

Figure 6:
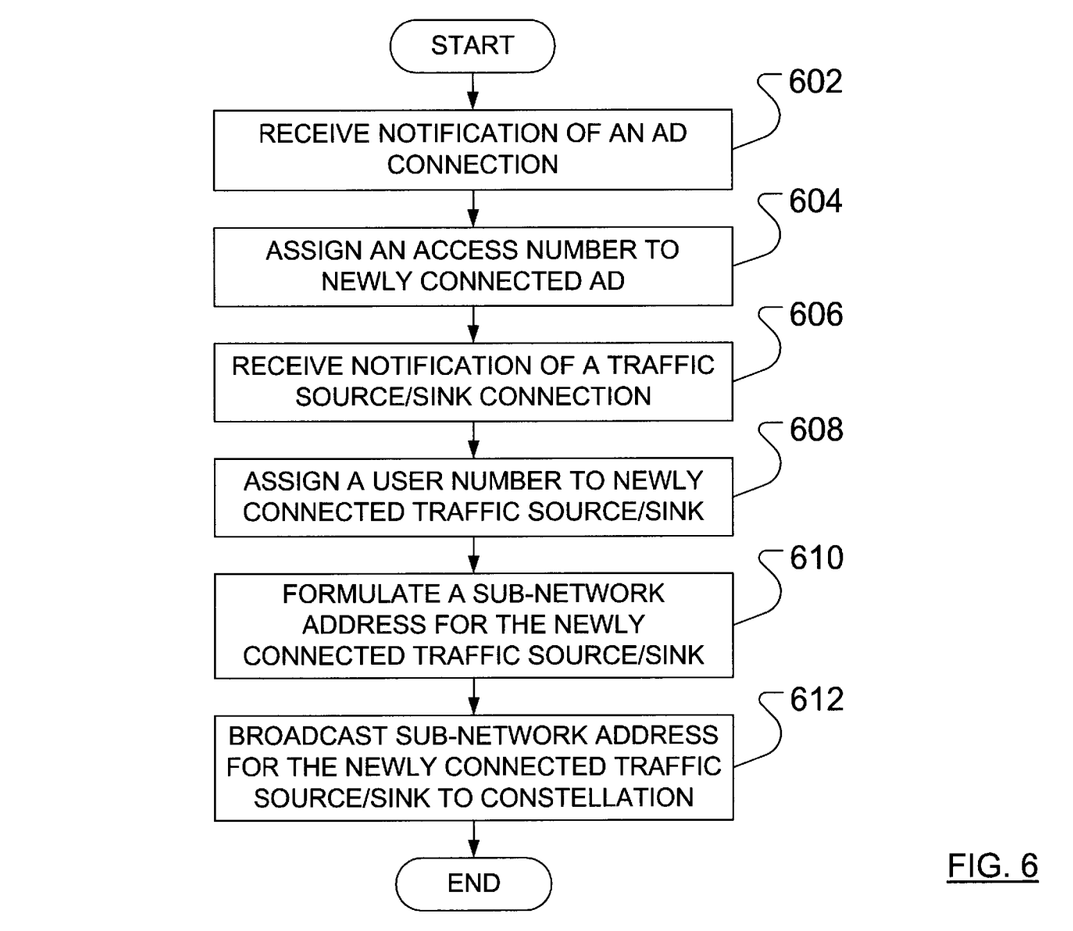
FIG. 6 illustrates steps of a sub-network address assigning method in accordance with an embodiment of the present invention.

In conjunction with FIG. 6, consider FIG. 3 before connections have been established between the AD 120E and either the constellation 310 or the traffic sources/sinks 114. A connection may be established between the AD 120E and the edge module 104(2). Upon receiving notification of this connection being established (step 602), the edge module 104(2) may assign the AD 120E an access number (step 604). Subsequently, the traffic source 114G connects to the AD 120E, thus prompting the AD 120E to inform the adjacent edge module 104(2) of the presence of the traffic source 114G. Upon receiving notification of the connection of the traffic source 114G being established (step 606), edge module 104(2) then assigns the traffic source 114G a user number (step 608). Once the traffic source 114G has been assigned a user number, the edge module 104(2) may formulate a sub-network address for the traffic source 114G (step 610) based on the architecture described in connection with FIG. 5. The edge module 104(2) then informs every edge module 104 in the constellation 310 of the sub-network address formulated for the traffic source 114G (step 612). For efficiency, the sub-network address broadcast in step 612 may not include the constellation number field 510.

The AD 120E may then connect to the edge module 104(6). Responsive to the new connection, the edge module 104(6) updates the sub-network address of the traffic source 114G to reflect the change in access code from 01000000 to 01000100 (read left to right). The edge module 104(6) then informs every edge module 104 in the constellation 310 of the updated sub-network address for traffic source 114G.

In future, when the traffic source/sink 114G requests a connection through the high-capacity network 102, the connection of the AD 120E to the high-capacity network 102 may be made through any of the adjacent edge modules 104(2), 104(4), 104(6), 104(8). To simplify the design of an AD 120, the selection of an adjacent edge module 104 for routing a connection may be arbitrary. The adjacent edge module 104 may be selected randomly or in a round robin manner, such that each adjacent edge module 104 receives packets at the same packet rate and, likely, the same bit rate.

A packet may also be forwarded to an adjacent edge module 104 based on the destination of the packet, where weight is given to the relative merits of the shortest paths from the adjacent edge modules 104(2), 104(4), 104(6), 104(8) to the adjacent edge modules in a constellation identified in the sub-network address of a destination traffic sink. An AD 120E may have a routing table associating a distinct range of address prefixes, or particular sub-net coordinates, to each adjacent edge module 104(2), 104(4), 104(6), 104(8). In another embodiment, the AD 120E may communicate the packet destination to each adjacent edge module 104(2), 104(4), 104(6), 104(8) in a request, of each adjacent edge module 104(2), 104(4), 104(6), 104(8), for an indication of a merit of a path to the packet destination. The AD 120E may then select an adjacent edge module 104 based on the returned merit indications, where merit may be a propagation delay over the path from the edge module supporting the source to the edge module supporting the sink.

The routing performed by an edge module 104 when sending a packet to another edge module 104 has been described in detail in U.S. patent application Ser. No. 09/624,079, titled "Multi-Dimensional Lattice Network." The routing performed by an edge module 104 when sending a packet to a traffic sink 114, whose network is formulated as above is describe below.

Figure 7:
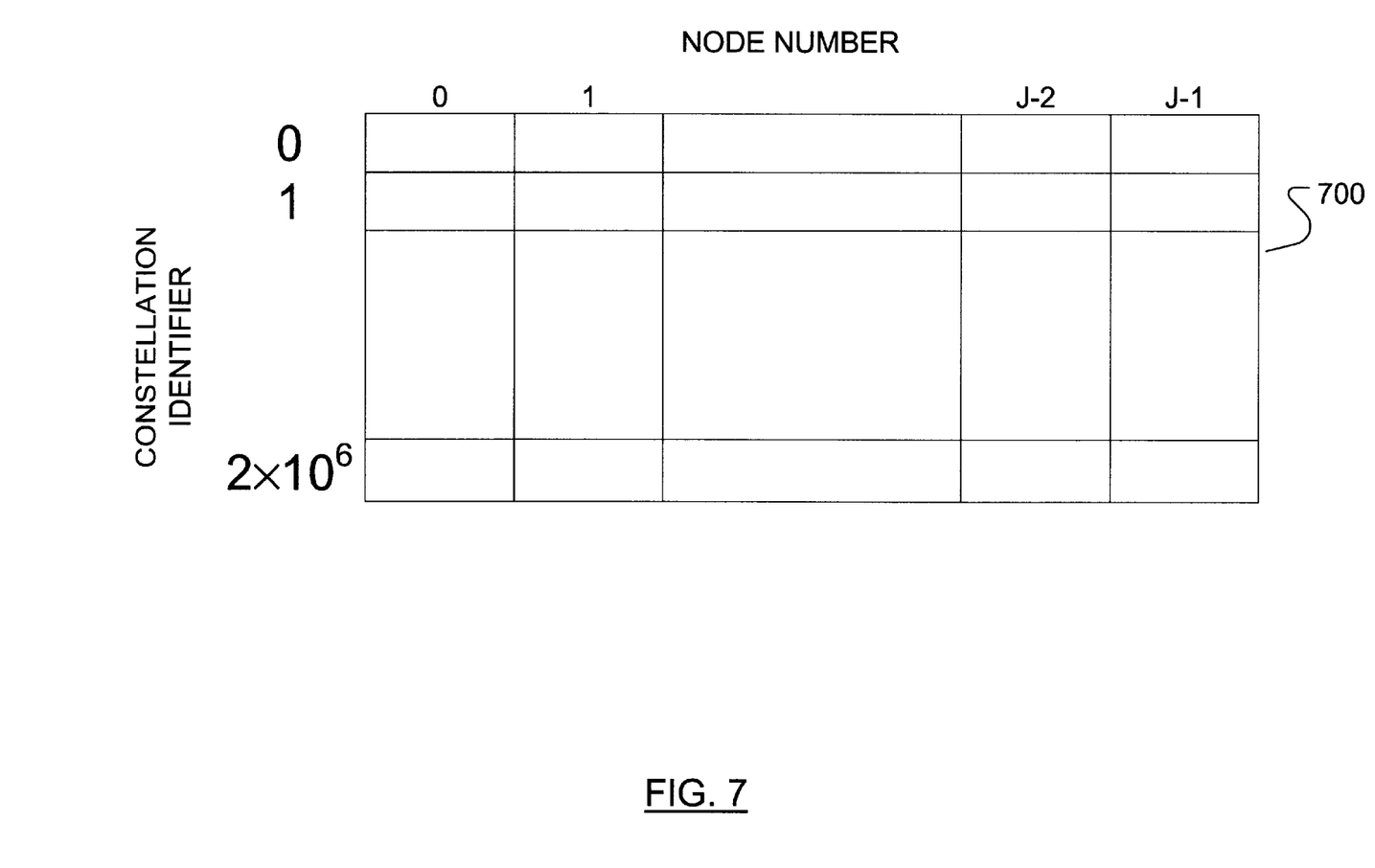
FIG. 7 illustrates a topology-description table as maintained at the edge module of FIG. 2 in accordance with an embodiment of the present invention.

FIG. 7 shows a topology-description table 700 as maintained at each edge module 104 in a high-capacity network 102 that has been arranged into constellations. In particular, the topology-description table 700 is for a network of 2 million constellations, having a maximum of 16 million nodes. The topology-description table 700 has as many rows as the number of constellations and as many columns as the number of nodes per constellation. Each cell in the topology-description table 700 stores a node identifier (network address). If the topology-description table 700 corresponds to a network having a four-dimensional lattice structure wherein the number of nodes along any dimension does not exceed 256 (which is a practical limit), then each cell is four bytes long.

Figure 8:
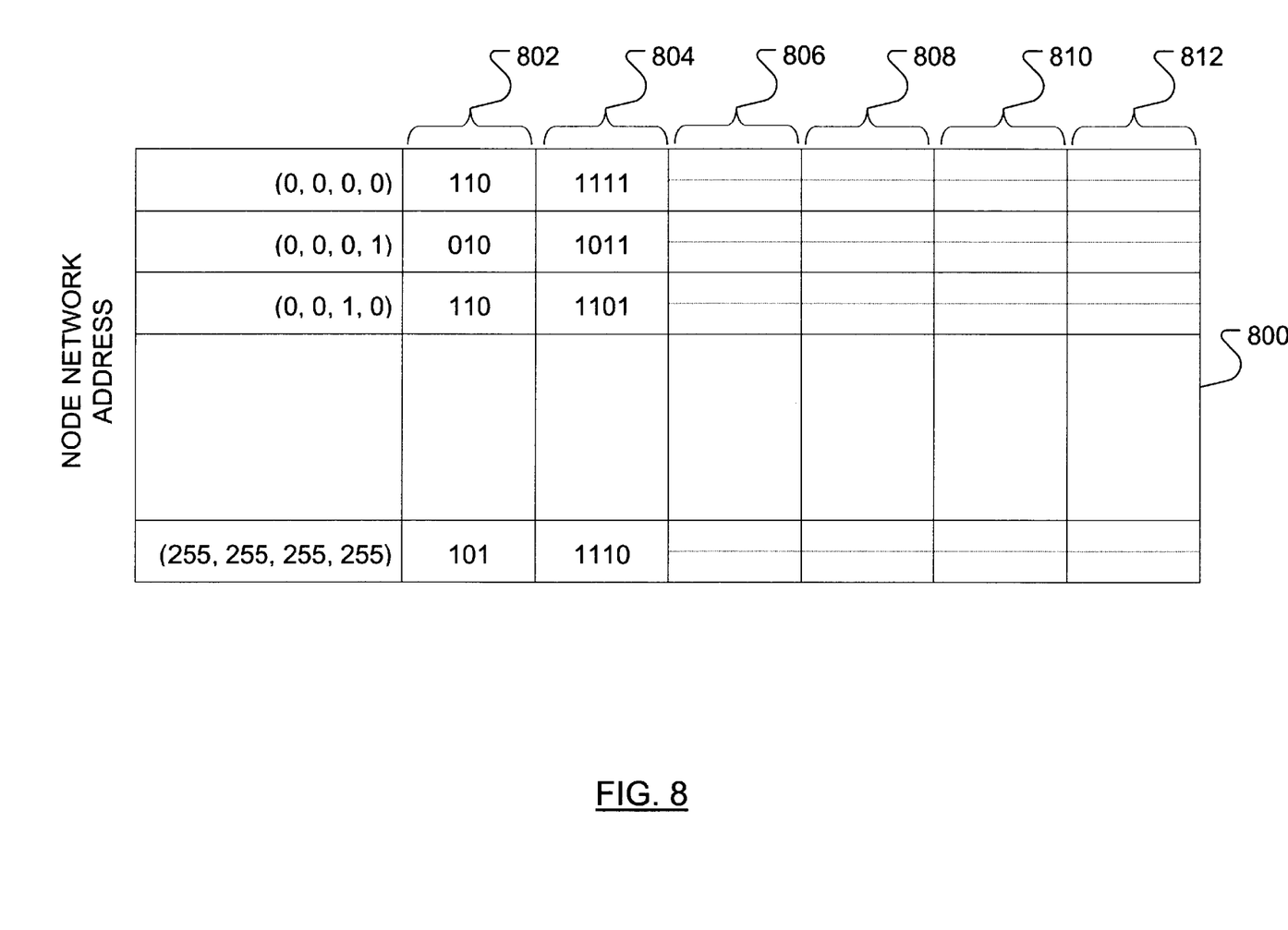
FIG. 8 illustrates a route-set generating table for an N-dimensional network (with N=4) as maintained at the edge module of FIG. 2 in accordance with an embodiment of the present invention.

FIG. 8 illustrates a route-set generating table 800 for a four-dimensional network structure that may grow to a capacity of hundreds of Exabits ($10^{18}$ bits) per second. The route-set generating table 800 has as many rows as the number of nodes (not the number of constellations) in the network. Where two million constellations have eight nodes each, the number of nodes is 16 million and a route-set generating table, according to the present invention, will have 16 million rows. A first column 802 of the route-set generating table 800 contains a 3-bit (N−1 bit) indicator of the preferred route-set generating permutation. A second column 804 route-set generating table 800 indicates a rotation code, which determines a number of parallel non-intersecting routes, as described in U.S. patent application Ser. No. 09/624,079, titled "Multi-Dimensional Lattice Network." Columns 806, 808, 810, 812 correspond to individual routes, the number of which corresponds to the network dimension (four routes, in this example) and may contain data relating to the individual routes. This data may include static data about route merit such as the inverse of a cost metric or a delay metric, for example. Each route can support the entire data load generated by a node, if so desired.

This data may further include dynamic data, for instance, an instantaneous indication of an assignment of traffic load. This information may be utilized to select favorable routes or to balance traffic loads among the routes. Generating a route in the preferred lattice structure is a simple operation that is typically faster to execute than reading route details from a random access memory (RAM).

Figure 9:
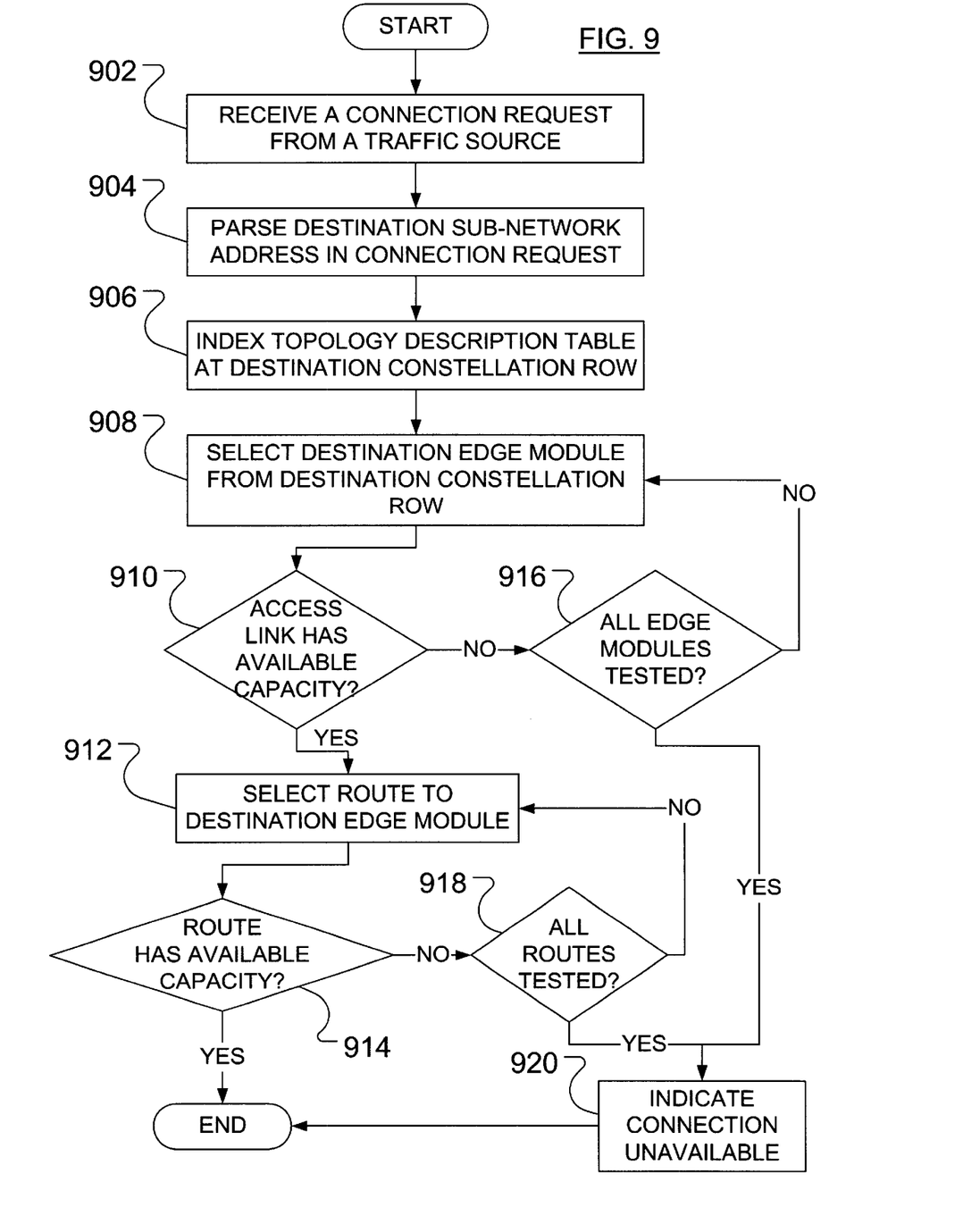
FIG. 9 illustrates steps of a route selection method in accordance with an embodiment of the present invention.

Returning to FIG. 1 in conjunction with FIG. 9, when a source edge module receives a connection request from a traffic source 114A (step 902), the source edge module parses a destination sub-network address (step 904) of a traffic sink 114D as indicated in the connection request and identifies a destination constellation number and a destination access code. The source edge module indexes the topology-description table 700 at the row corresponding to the destination constellation number (step 906). In this example, each constellation has eight nodes, however, the AD 120D through which the traffic sink 114D gains access to the high-capacity network 102 may only be connected to a subset of the edge modules in the constellation, as indicated by the access code included in the sub-network address of the traffic sink 114D. The source edge module selects, as a destination edge module, one of the edge modules 104 in the destination constellation to which the AD 120D is connected (step 908). This selection may be made according to a round-robin discipline, or by using a load-balancing vector to equalize the loading of the links between the destination constellation and the AD 120D. If it is determined that the access link connecting the selected destination edge module to the AD 120D does not have sufficient free capacity (step 910), an alternate destination edge module may be selected (step 908) using the topology-description table 700 in conjunction with the destination access code. However, before selecting an alternate destination edge module, it must first be determined whether any potential destination edge modules remain to be tested for available capacity (step 916). If all potential destination edge modules have been unsuccessfully tested for available capacity, the source edge module then indicates to the traffic source 114A that a connection to the destination sub-network address is unavailable (step 920).

Although the use of the load-balancing vector for each constellation provides some advantages, the requirement for RAM storage in the edge module memory 204 (FIG. 2) is increased. Accommodating the load-balancing vector for each constellation requires appending two byte for example, to each cell in the topology-description table 700. Each cell in the topology-description table 700 would then have two fields: a node identification field and a load-assignment indicator field. The load-assignment indicator would be increased when a load is assigned and decreased when a load is removed.

Once the destination edge module has been selected, the source edge module selects a route to the destination edge module (step 912). Selecting a route for a connection from the source edge module to the destination edge module leading to the AD 120D may be accomplished using the route-set generating table 800 of FIG. 8. If it is determined that the route from the source edge module to the selected destination edge module does not have sufficient free capacity (step 914), a new route based on a different rotation may be selected (step 912) using the route-set generating table 800. Before selecting a new route, it must first be determined whether any rotations remain to be tested for available capacity (step 918). If routes based on all rotations have been unsuccessfully tested for available capacity, the source edge module then indicates to the traffic source 114A that a connection to the destination sub-network address is unavailable (step 920).

For a full description of a route-set generation method involving permutations and rotations, see the U.S. patent application Ser. No. 09/624,079, titled "Multi-Dimensional Lattice Network." The selection of the destination edge module (and consequently, the access link connecting the selected destination edge module to the AD 120D) is performed independently from the selection of a route between the source edge module and the selected destination edge module. As noted, if either of the two selection processes (step 908, step 912) fails they may be repeated. However, use of the load-balancing vector mentioned above may render the probability of such connection blocking infinitesimally small.

To provide interworking between the Internet 110 and the high-capacity network 102, selected edge modules 104 are designated gateway edge modules and function both as legacy routers, like Internet routers 112, and universal switches (one such universal switch is described in U.S. patent application Ser. No. 09/244,824 titled "Rate-Controlled Multi-Class High-Capacity Packet Switch," filed on Feb. 4, 1999, the contents of which are hereby incorporated herein by reference). While the gateway edge module 104 is functioning as an Internet router 112, the gateway edge module 104 is capable of resolving IP addresses and understanding IP information distribution protocols such as OSPF and BGP.

The provision of interworking between the new high-capacity network 102 and a legacy network (the Internet 110) requires that we distinguish four types of transactions: legacy-to-legacy; legacy-to-new; new-to-new; and new-to-legacy. These may be examined in the context of the previously identified four basic processes of data communication, namely topology information distribution, network-state information distribution, route selection and forwarding.

Any change in the topology of the Internet 110 is communicated by the Internet routers 112 to other Internet routers 112 (legacy-to-legacy) and to gateway edge modules 104 of the high-capacity network 102 (legacy-to-new). Topology changes within the Internet 110 that affect routing within the Internet 110 are thus known to both the Internet routers 112 and gateway edge modules 104. New IP address prefixes that appear in the Internet 110 are communicated to all Internet routers 112 and gateway edge modules 104 in a conventional way.

A new address appearing in the high-capacity network 102 is communicated only within the high-capacity network 102 (new-to-new). The Internet routers 112 cannot resolve addresses in the high-capacity network 102 and, therefore, need not learn of new addresses (new-to-legacy). Even if the high-capacity network 102 was to adopt IP address, routing and forwarding schemes, the quantity of new addresses in the high-capacity network 102 would quickly overwhelm the processors of current IP routers. Topology-change information is communicated one way, from the Internet 110 to the gateway edge modules 104. Each gateway edge module 104 can construct a routing table for Internet-bound packets.

As is the case with topology information distribution, the process of network-state information distribution within the Internet 110 (legacy-to-legacy) and within the high-capacity network 102 (new-to-new) is maintained as usual. That is to say, well established protocols are used to keep the Internet routers 112 up-to-date with regard to the state of other routers in the Internet 110 and links between those routers. In contrast, nodes in the high-capacity network 102 learn about the state of nodes to which they have activated routes through the transmission and receipt of continuity packets as hereinbefore described.

Network-state information only crosses an interface between the Internet 110 and the high-capacity network 102 in one direction. The Internet routers 112 need not have any knowledge of the state of nodes and links between nodes in the high-capacity network 102. However, gateway edge modules 104 may make use of information regarding a link to a particular subordinate Internet router 112. To this end, gateway edge modules 104 send periodic "hello" messages to subordinate Internet routers 112 and expect a response. Lack of timely response from a particular subordinate Internet router 112 may be enough to indicate to the gateway edge module 104 that the link to the particular subordinate Internet router 112 is not functioning. Further, the well established protocols that are used to keep the Internet routers 112 up-to-date with regard to the state of routers in the Internet 110 and links between those routers are also used to communicate that information to gateway edge modules 104. Gateway edge modules 104 may then maintain routing tables for the Internet 110 based on the same information distributed among the Internet routers 112.

Route selection within the Internet 110 (legacy-to-legacy) is not altered when the hybrid network 100 (FIG. 1) is formed by the addition of the high-capacity network 102. Similarly, the route selection process within the high-capacity network 102 (new-to-new) remains unchanged by the addition of the Internet 110.

Given a packet having a destination address in the high-capacity network 102 (legacy-to-new), it is the task of a particular Internet router 112 to recognize the destination address as being different and communicate the packet to a gateway edge module 104.

When routing a packet from the high-capacity network 102 to the Internet 110 (new-to-legacy), the edge module 104 responsible for the routing selects a gateway edge module 104. This selection may be made at random or according to a simple learning process. The selected gateway edge module 104 may have one or more routes associated with a destination Internet router 112 and can select one of these routes.

As is the case with each of the other data communication processes, forwarding within the Internet 110 (legacy-to-legacy) is unchanged by the creation of the hybrid network 100 (FIG. 1). The Internet routers 112 continue to try to match the address of an IP destination address with a prefix in a routing table and, if a match is not found, forward packets with the IP destination address to a router with a more extensive routing table. Equally unchanged is the forwarding process followed within the high-capacity network 102 (new-to-new). That is to say that each edge module 104 has information about the best edge module 104 to be used to reach any address in the high-capacity network 102. The edge module 104 may have information, in a routing table, about the best route, second-best route, etc.

Further, the selected edge module 104 has the capacity to recognize a prefix of a destination address in the Internet 110 (new-to-legacy). A packet having such a destination IP address may be forwarded to a gateway edge module 104 that, by definition, has a routing table for destinations within the Internet 110. Using the routing table, which is maintained up-to-date through the receipt of IP-based protocols, the gateway edge module 104 may determine a best route through the Internet 110 in the same manner as an Internet router 112 would.

If an Internet router 112 receives a packet and must resolve a destination address in the high-capacity network 102 (legacy-to-new), the Internet router 112 forwards the packet to a gateway edge module 104. The forwarding process then becomes a routine routing exercise for the edge module 104. For the Internet router 112 to recognize that a destination address is in the high-capacity network 102, a clue should be provided within the constraints of current IP addressing practices.

As will be apparent to a person skilled in the art, the legacy packet network 110 need not, necessarily, be the Internet.

Other modifications will be apparent to those skilled in the art and, therefore, the invention is defined in the claims.

We claim:

1. A method of providing access to a high-capacity data network at an edge node of said high-capacity data network comprising:
where an access device connects to said edge node, assigning a device number to said access device, if not already assigned;
upon receipt of an indication of a traffic source from said access device, assigning a user number to said traffic source, if not already assigned;
upon assigning said user number, formulating a sub-network address for said traffic source and broadcasting said sub-network address to a pre-defined set of nodes.

2. The method of claim 1 wherein said sub-network address comprises an indication of said device number.

3. The method of claim 2 wherein said sub-network address further comprises an indication of a length of said indication of said device number.

4. The method of claim 1 wherein said sub-network address comprises an indication of said user number.

5. The method of claim 1 wherein nodes of said high capacity network are arranged in constellations, said pre-defined set of nodes comprising one said constellation of nodes and wherein each said constellation of nodes is identified by a constellation number and said sub-network address comprises an indication of said constellation number.

6. The method of claim 5 wherein said sub-network address further comprises an indication of a length of said indication of said constellation number assigned to said constellation.

7. The method of claim 1 wherein said sub-network address comprises an indication of a length of said sub-network address.

8. The method of claim 1 wherein said access device connects to at least two edge nodes in said constellation and said sub-network address comprises an indication of specific edge nodes to which said access device connects.

9. An edge node in a constellation of nodes within a high-capacity data network, said edge node comprising:
    a processor for:
        assigning a device number to an access device;
        assign a user number to a traffic source;
        formulating a sub-network address for said traffic source; and
    an interface for broadcasting said sub-network address to said constellation of nodes.

10. A computer readable medium containing computer-executable instructions which, when performed by an edge node in a constellation of nodes within a high-capacity data network, cause the processor to:
    assign a device number to an access device;
    assign a user number to a traffic source;
    formulate a sub-network address for said traffic source; and
    broadcast said sub-network address to said constellation of nodes.

11. A method of providing information to a pre-defined set of nodes, said information regarding an access device, said method comprising:
    where an access device connects to an edge node, assigning a device number to said access device, if not already assigned;
    upon assigning said device number, formulating a welcome message indicating an association of said device number to said access device; and
    broadcasting said welcome message to said pre-defined set of nodes.

12. An edge node in a constellation of nodes within a high-capacity data network, said edge node comprising operable to:
    a processor for:
        assigning a device number to an access device;
        formulating a welcome message indicating an association of said device number to said access device; and
        an interface for broadcasting said welcome message to said constellation of nodes.

13. A computer readable medium containing computer-executable instructions which, when performed by an edge node in a constellation of nodes within a high-capacity data network, cause the processor to:
    where an access device connects to said edge node, assign a device number to an access device, if not already assigned;
    upon assigning said device number, formulate a welcome message indicating an association of said device number to said access device; and
    broadcast said welcome message to said pre-defined set of nodes.

* * * * *

UNITED STATES PATENT AND TRADEMARK OFFICE
CERTIFICATE OF CORRECTION

| | | |
|---|---|---|
| PATENT NO. | : 6,771,651 B1 | Page 1 of 1 |
| APPLICATION NO. | : 09/672816 | |
| DATED | : August 3, 2004 | |
| INVENTOR(S) | : Maged E. Beshai and Paul F. Daspit | |

It is certified that error appears in the above-identified patent and that said Letters Patent is hereby corrected as shown below:

The following acknowledgement of government rights in the invention should precede the FIELD OF THE INVENTION section:
Col. 1 Line 5 - 7
GOVERNMENT LICENSE RIGHTS This invention was made with Government support under Technology Investment Agreement F30602-98-2-0194 awarded by the Air Force. The Government has certain rights in the invention.

Signed and Sealed this

Fifth Day of December, 2006

JON W. DUDAS
*Director of the United States Patent and Trademark Office*